United States Patent
Lavin et al.

(10) Patent No.: US 8,775,988 B2
(45) Date of Patent: Jul. 8, 2014

(54) DECENTRALIZED DYNAMICALLY SCHEDULED PARALLEL STATIC TIMING ANALYSIS

(75) Inventors: Mark A. Lavin, Katonah, NY (US); David J. Hathaway, Underhill Center, VT (US); Kerim Kalafala, Rhinebeck, NY (US); Jeffrey S. Piaget, Red Hook, NY (US); Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/150,445

(22) Filed: Jun. 1, 2011

(65) Prior Publication Data

US 2012/0311514 A1  Dec. 6, 2012

(51) Int. Cl.
*G06F 17/50* (2006.01)
*G06F 9/455* (2006.01)

(52) U.S. Cl.
USPC ........... 716/108; 716/104; 716/106; 716/110; 716/113; 716/132; 716/134; 716/136; 716/139

(58) Field of Classification Search
USPC ......... 716/104, 106, 108, 110, 113, 132, 134, 716/136, 139
See application file for complete search history.

(56) References Cited

U.S. PATENT DOCUMENTS

| | | | |
|---|---|---|---|
| 5,508,937 A * | 4/1996 | Abato et al. | 716/134 |
| 6,202,192 B1 * | 3/2001 | Donath et al. | 716/108 |
| 6,557,145 B2 * | 4/2003 | Boyle et al. | 716/105 |
| 6,557,151 B1 * | 4/2003 | Donath et al. | 716/108 |
| 7,260,800 B1 * | 8/2007 | Koelbl et al. | 716/106 |
| 7,742,906 B2 * | 6/2010 | Zhou et al. | 703/13 |
| 7,793,243 B1 | 9/2010 | Becer et al. | |
| 7,797,658 B2 | 9/2010 | Chen et al. | |
| 7,958,474 B2 * | 6/2011 | Chen et al. | 716/108 |
| 8,001,500 B2 * | 8/2011 | Koelbl et al. | 716/104 |
| 8,381,150 B2 * | 2/2013 | Zolotov et al. | 716/108 |
| 2001/0010090 A1 * | 7/2001 | Boyle et al. | 716/2 |
| 2008/0109774 A1 * | 5/2008 | Baumgartner et al. | 716/5 |
| 2011/0289507 A1 * | 11/2011 | Khan et al. | 718/104 |
| 2012/0066656 A1 * | 3/2012 | Sripada et al. | 716/108 |
| 2012/0239372 A1 * | 9/2012 | Kruus | 703/17 |

OTHER PUBLICATIONS

Murthy et al.; "Multidimensional synchronous dataflow"; Publication Year: 2002; Signal Processing, IEEE Transactions on; vol. 50, Issue: 8; pp. 2064-2079.*

(Continued)

*Primary Examiner* — Helen Rossoshek
(74) *Attorney, Agent, or Firm* — H. Daniel Schnurmann

(57) ABSTRACT

A method for performing a parallel static timing analysis in which multiple processes independently update a timing graph without requiring communication through a central coordinator module. Local processing queues are used to reduce locking overhead without causing excessive load imbalance. A parallel analysis is conducted on a circuit design represented by a timing graph formed by a plurality of interconnected nodes, the method including: using a computer for creating a shared work queue of ready to process independent nodes; assigning the independent nodes from the work queue to at least two parallel computation processes, simultaneously performing node analysis computations thereof; and modifying the circuit design by updating values of the processed independent nodes obtained from the node analysis, the at least two parallel computation processes independently updating the shared work queue to process a new plurality of independent nodes.

17 Claims, 11 Drawing Sheets

(56) References Cited

OTHER PUBLICATIONS

Gulati et al.; "Accelerating statistical static timing analysis using graphics processing units"; Publication Year: 2009; Design Automation Conference, 2009. ASP-DAC 2009. Asia and South Pacific; pp. 260-265.*

Shin et al.; "Thread-based software synthesis for embedded system design"; Publication Year: 1996; European Design and Test Conference, 1996. ED&TC 96. Proceedings; pp. 282-286.*

\* cited by examiner

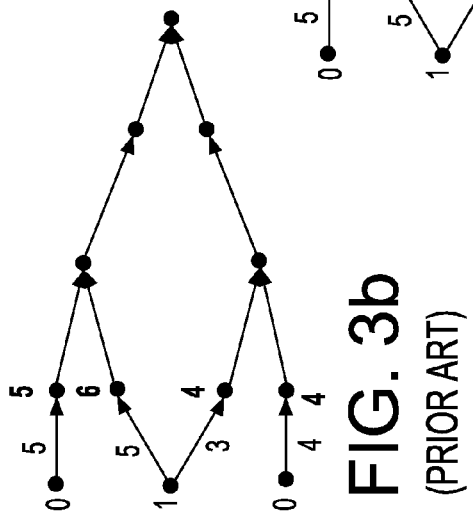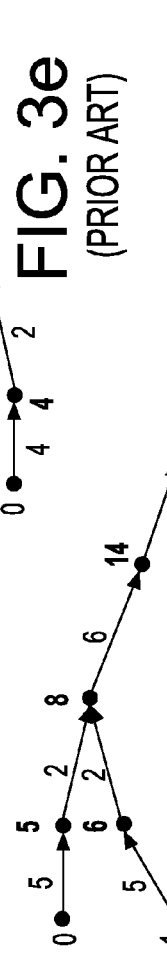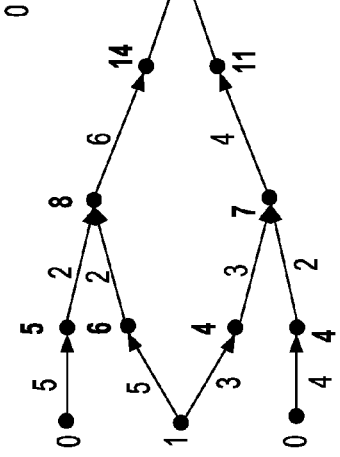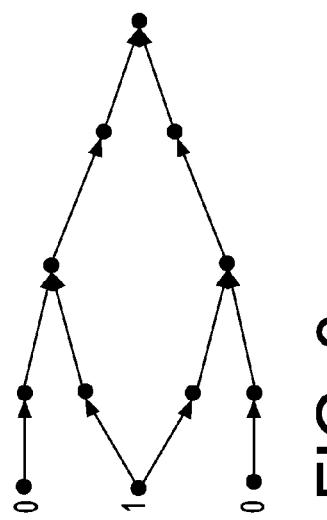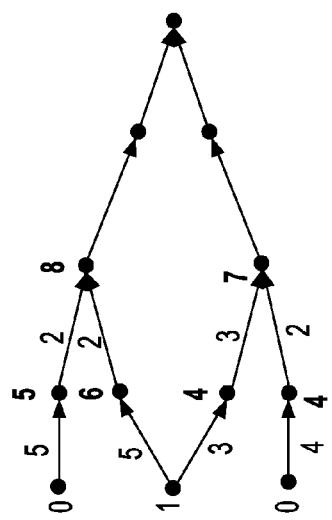
FIG. 3a (PRIOR ART)
FIG. 3b (PRIOR ART)
FIG. 3c (PRIOR ART)
FIG. 3d (PRIOR ART)
FIG. 3e (PRIOR ART)

DECENTRALIZED DYNAMICALLY SCHEDULED PARALLEL STATIC TIMING ANALYSIS

FIELD OF THE INVENTION

The present invention relates to Computer Aided Design (CAD), and more particularly, to a Static Timing Analysis simulating the timing of signals in a circuit to achieve full compliance with respect to certain design constraints; and further, to a method for accelerating the computation through the use of parallel processing by dividing the computation across two or more computing processes executed simultaneously.

BACKGROUND

Static Timing Analysis (STA), is a CAD application used in the synthesis, optimization and analysis of digital electronic circuits consisting of a plurality of active circuit elements, e.g. gates or transistors connected through networks of wires, referred to as nets.

Referring to FIG. 1, a digital electronic circuit is illustrated, having shapes labeled NAND0, NAND1, NAND2, NOT0, NOR0, and NOT1 representing circuit elements, wherein gates referenced as NAND, NOT and NOR represent specific logic functions. Arrows between shapes represent nets. The labels I1-I5 and O1-O3 represent the inputs and outputs of the digital circuit.

An objective of STA is to predict the behavior of circuits in terms of bounds on the times at which certain events occur, e.g., the transition of a signal at the output of a particular gate from a logic "0" state to a logic "1" state, in order to ensure certain time constraints on those events, such as their relative order, or comparison with an externally supplied specification (e.g., overall circuit frequency). Furthermore, STA predicts circuit timing by: (1) asserting the time of certain events (e.g., transitions on circuit input signals), (2) using a variety of simulation techniques, to predict the time delay between input events and output events of circuit elements or nets and (3) Computing bounds on the time of events other than the asserted input event times by means of event propagation, in which the time of an event at the output of a circuit element or net is computed to be some combination operation (e.g., maximum or minimum) applied to a set of propagated input event times determined as the sum of each input event time and the delay of the circuit element or net.

The detailed operation of the preceding steps is best understood by way of a timing graph, a directed graph whose nodes are referred to as timing points and whose edges are referred to as propagate segments. Timing points correspond to the inputs and outputs of circuit elements (e.g., gates) and nets; propagate segments correspond to connections between timing points, of two types: devices propagate segments correspond to the internal connection between a circuit element inputs and outputs, and net propagate segments correspond to the connections between circuit elements, which comprise nets.

Referring to FIG. 2, a timing graph is illustrated that corresponds to the digital electronic circuit shown in FIG. 1. Small dots with labels starting with "tp" represent timing points, while lines with labels starting with "ps" represent propagate segments. As an example, timing points labeled tp5 and tp6 represent the two inputs to the AND0 circuit element shown in FIG. 1, and timing point tp10 represents the output of AND0. Propagate segments labeled ps6 and ps7 represent the internal connections between AND0 inputs and outputs. Propagate segment ps11 represents the external connection (net) between timing point tp10, the output of circuit element NAND0, and timing point tp13, one of the inputs of circuit element NOR0. Timing points labeled I1-I4 and O1-O3 represent the inputs and outputs of the overall circuit.

An STA application typically defines data structures that correspond to timing points, to propagate segments, and to the overall timing graph. The timing point data structures potentially hold information about bounds on the times at which certain events, e.g., logic transitions of a specified type (e.g., logic "0" to logic "1", or logic "1" to logic "0") occur. The propagate segment data structures potentially hold information about the delay between events at its input timing point and its output timing point; they may also contain information about how that delay value is to be computed, e.g., the modeled propagation time within circuit elements, or the resistance and capacitance of the electrical connection between circuit elements.

STA applications typically begin by inputting a description of the circuit to be analyzed and constructing a corresponding timing graph data structure consisting of a multiplicity of timing point and propagate segment data structures. In standard practice, the directed timing graph is converted to a directed acyclic timing graph (hereinafter, DAG) by breaking loops by "snipping" certain propagate segments. Possible timing errors missed by the removal of the propagate segments can be detected by adding certain constraints or tests applied to the remaining DAG elements. Once the timing graph has been converted to a DAG, in one aspect of the STA application, it may be described as follows. The aforementioned aspect is referred to as arrival time propagation, and computes for each timing point an estimate of the worst case time at which the effects of an event on one or more of the overall circuit inputs propagates to the specified timing point, i.e., a bound on the arrival time at the timing point.

Arrival time (AT) can be calculated for a given timing point by: (1) enumerating all paths leading from any input to the timing point, (2) calculating the AT at the end of the path as the AT of the input to which are added the delays of all the propagate segments on the path, (3) in late (early) timing, computing an upper (lower) bound on the AT by taking the maximum (minimum) of the ATs along all paths and assigning that as the AT at the selected timing point. Since this method may display a computational complexity of the order of exponential of the number of propagate segments, it is typically performed in a block based manner, wherein each timing point AT can be computed once the ATs of its immediately preceding timing points and delays of the propagate segments connecting them to the selected timing point are known: For the so called late mode propagation, for example, it is the maximum of the sum of each preceding timing point AT and the corresponding propagate segment delay. The forgoing is illustrated in FIGS. 3a-3e using a part of the timing graph shown in FIG. 2.

By way of example, in FIG. 3a, ATs are asserted at the overall inputs, as indicated by the numbers 0, 1 and 0, corresponding to time units. In FIG. 3b, delay values have been added to each of the propagate segments leading from the input timing points, and each of the timing points at the ends of those propagate segments can then be assigned the max of the sums of the AT and delay at each input. FIGS. 3c-3e show how these operations can be used to eventually assign ATs to all the timing points of the circuits. Analogous techniques are used to propagate required arrival times (RATs) "backward" from circuit output timing points to circuit inputs; once this is done, a "slack" (in late mode, slack=RAT−AT) can be computed at each timing point, and negative slack values indicate potential timing violations.

A critical aspect of the block based computation of ATs is that an AT for a given timing point can be computed if and only if the ATs and delays of its preceding timing points and propagate segments have been computed. One way to ensure this is by pre-levelizing the timing graph. As illustrated in FIG. 4, it is possible to associate with each timing point in a loop free timing graph (more generally, a DAG) a number (hereinafter referred to as AT level), which indicates the length of the longest path from any input to that timing point; this can be computed in time linear in the number of graph edges by topological sorting.

Referring to FIG. 5, an algorithm for a block based STA is shown.

In the first step 005, the AT level is computed for all timing points. The second step 010 consists of iteration over an integer index ranging from 0 to the maximum AT level in the graph. Within each iteration, there is a second nested iteration starting at step 015 over all the timing points with the respective AT level. For each point, there is a third nested iteration starting at step 020 over all the propagate segments incident on the given timing point. For each such segment, in step 025 its delay is calculated, and added to the AT of its source timing point, and in step 030 the maximum (minimum) of those values for each segment is computed and stored as the late (early) mode AT value for the respective timing point. The process finishes at step 035 when all the AT levels have been processed. The topological ordering ensures that when a given timing point is processed, all of its predecessor timing points, with lower AT levels, will already have been processed. Another technique to guaranty a proper dependency ordering consists satisfying an AT query by performing a depth first recursive search through the DAG starting at the query point and working backwards to the frontier point where ATs have either already been calculated, or are known via a user supplied assertion. Once the frontier of previously known ATs has been encountered, AT values can be recursively updated in the fan-in cone of the original query point.

It may be appreciated that the computation time for large digital electronic circuits, e.g., comprising millions of gates and nets, may be considerable. It may also be appreciated that there is a potential to accelerate this computation through parallel processing, a technique in which a computation may be divided among a multiplicity of computing devices so that the overall elapsed time of the computation is reduced. One example of the referenced task level parallelization is to perform STA on two or more independent digital circuits simultaneously, each on its own respective computing device. Another technique exploits the fact that within a given timing graph, corresponding to a single digital circuit, there is the possibility of performing certain computations simultaneously. By way for example, and referring back to FIG. 2, all the delays calculated on the first rank of propagate segments can be performed independently, hence simultaneously. Similarly, once those are complete, calculating the ATs of the second rank of timing points can be performed simultaneously.

It is also to be noted that there are still constraints that limit the number of computations that can be performed simultaneously, namely the requirement that the ATs and delays of a particular timing point predecessor timing points and propagate segments be computed before the subject timing point ATs can be computed.

a. Existing parallel implementations of STA enforce this constraint through the use of a parallel version of the aforementioned levelized analysis technique, as shown in FIG. 6. While the loop over timing levels (Box 040 in FIG. 6) is sequential, within a given level, all the timing points on that level can be divided (050) among a multiplicity of computing elements operating simultaneously (055-080). The main computation waits for all of the computing elements to complete their respective computations (080), at which time the next level is processed (045) until all levels have been completed (095). This technique has been demonstrated to reduce overall STA runtime, but suffers from a problem that occurs for many parallel algorithms, load balancing. This problem occurs when workload is divided unevenly among parallel computing elements, resulting in elements performing no computation while waiting for other elements to complete. In the case of parallel levelized STA, this may occur because the number of timing points to be processed for a given AT level is fewer than the number of available computing elements, or because the amount of computation assigned to each computing element is not balanced because it varies between different timing points; an example is that a timing point preceded by a very large net (e.g., power or clock) may take considerably more time for delay computation compared with a timing point preceded by a single input single output net. The overall effect of load imbalance is that the parallel speedup (the ratio of serial runtime to parallel runtime) approaches a limit in spite of adding more and more computing elements.

b. It may be appreciated that the levelized technique is unduly restrictive with respect to the underlying precedence constraint. Timing points in two disjoint paths or sub-graphs can proceed in parallel without regard to the specific AT levels. This observation leads to approaches to parallelization, so called dynamically schedule parallel STA. Another prior art method teaches a static timing analysis performed in parallel using multiple "compute modules" which can span AT levels. However, a deficiency of the prior art is that it relies on a central "control module" to perform all updates on the timing graph and to determine a set of next available work based on most recent result. To the extent that such implementations rely on a single, sequential (non-parallel) mechanism, they are subject to the well known Amdahl Law which states that parallel speedup is limited by the fraction of the computation that is non-parallel.

A further aspect of static timing analysis involves reacting to design changes and recomputing timing results based thereon. As an example, an optimization program may perform slack based design closure wherein an initial timing analysis is performed on the entire design, and then logic/physical design changes are made with the goal of improving slack. In such scenarios, it can be appreciated that numerous such changes followed by a query for updated ATs and/or RATs may be performed in the inner loop of optimization, and that accordingly it is imperative that such incremental recalculations of timing data occur in an efficient manner. One technique for efficiently performing incremental timing calculations involves the use of level limited recalculation queues, wherein the aforementioned AT and RAT levels are used to determine a potential dependency of a given AT (RAT) time query on a pending design change. Generally, after a design change is first detected, corresponding nodes are eventually inserted in to the appropriate AT (RAT) recalculation queues which are sorted based on AT (or RAT) level. Once a query is made, queues are processed in a levelized manner, during which additional nodes may be inserted in to the recalculation queues as a result of propagated change effects. Two key advantages of levelized processing are: i) dominance limiting criteria can be used to limit the forward, in the case of AT (or backward in the case of RAT), propagation of changes (e.g., in the case of AT propagation, if a propagated change has no effect on downstream AT due to another side input fully determining said downstream value, then no further local propagation of changes need occur), and ii) level limiting can be used to prevent propagation of changes beyond the point at which one needs to propagate in order to satisfy a particular query. In the case of RAT calculation, it is to be furthermore appreciated that since RATs generally depend on ATs (e.g., RAT at the data end of a test depends on AT for the corresponding clock reference signal), a query for RAT may result in the need to compute further downstream ATs. Fortunately, such processing of AT changes in response to a RAT query can use similar levelized queue processing mechanisms as described above (and in particular, the processing of AT dependencies due to RAT calculation can be level limited if one can determine a priori a maximum AT level for which a given RAT query depends on AT).

One method for performing parallel level limited incremental analysis uses message passing between computer processors that do not necessarily share memory, and assumes a partitioning of a design into separate DAGs or sub-circuits which prevents efficient load balancing. However it is often the case that number of nodes on a given level of the AT or RAT queue at any given point in the analysis is quite small. Therefore, prior art techniques for parallel static timing analysis which involve synchronizing at each AT (RAT) level suffer from particular poor scaling, especially in cases where load imbalance causes compute resources to wait idle during the synchronization step at each graph level.

Accordingly, there is a need for a method that efficiently performs parallel static timing analysis, which enables efficient incremental re-analysis in response to design changes without imposing limitations of load imbalance introduced with partitioned and levelized configurations and, furthermore, which does not require a centralized control module, but can be adapted to scale to a large number of parallel processors.

BRIEF DESCRIPTION OF THE DRAWNGS

The present invention will be understood and appreciated more fully from the following detailed description of the invention, taken in conjunction with the accompanying drawings of which:

FIGS. 3a-3e are examples of a late arrival time propagation, as it is known in the prior art;

SUMMARY

Figure 1:
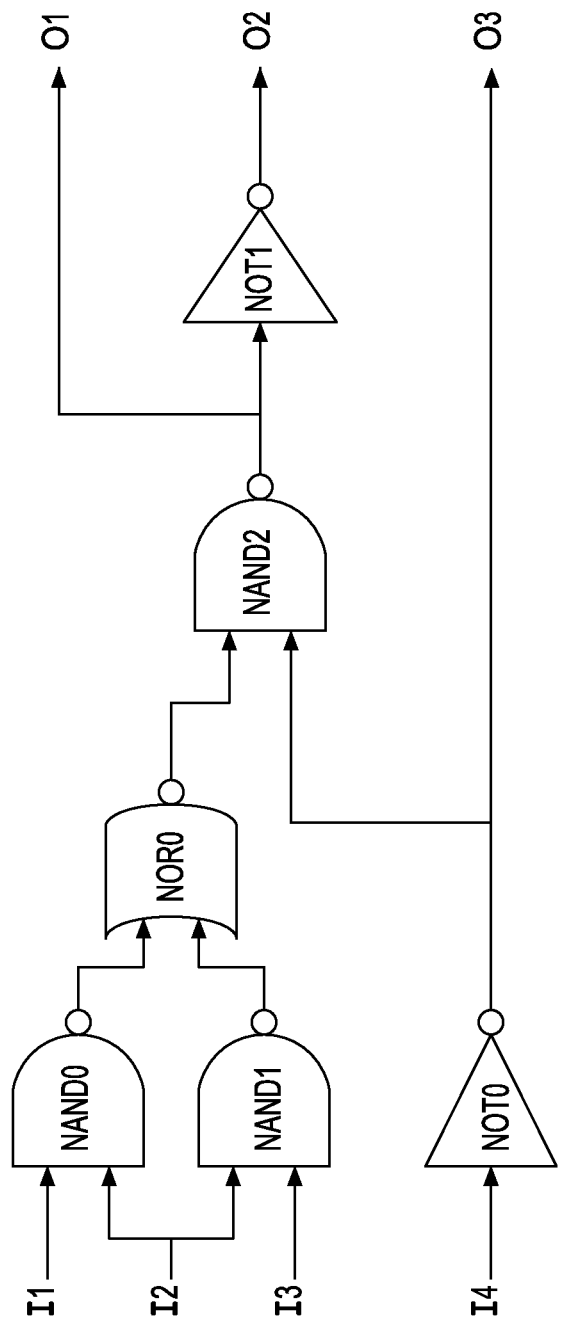
FIG. 1 is an illustrative prior art gate level digital circuit.
Figure 2:
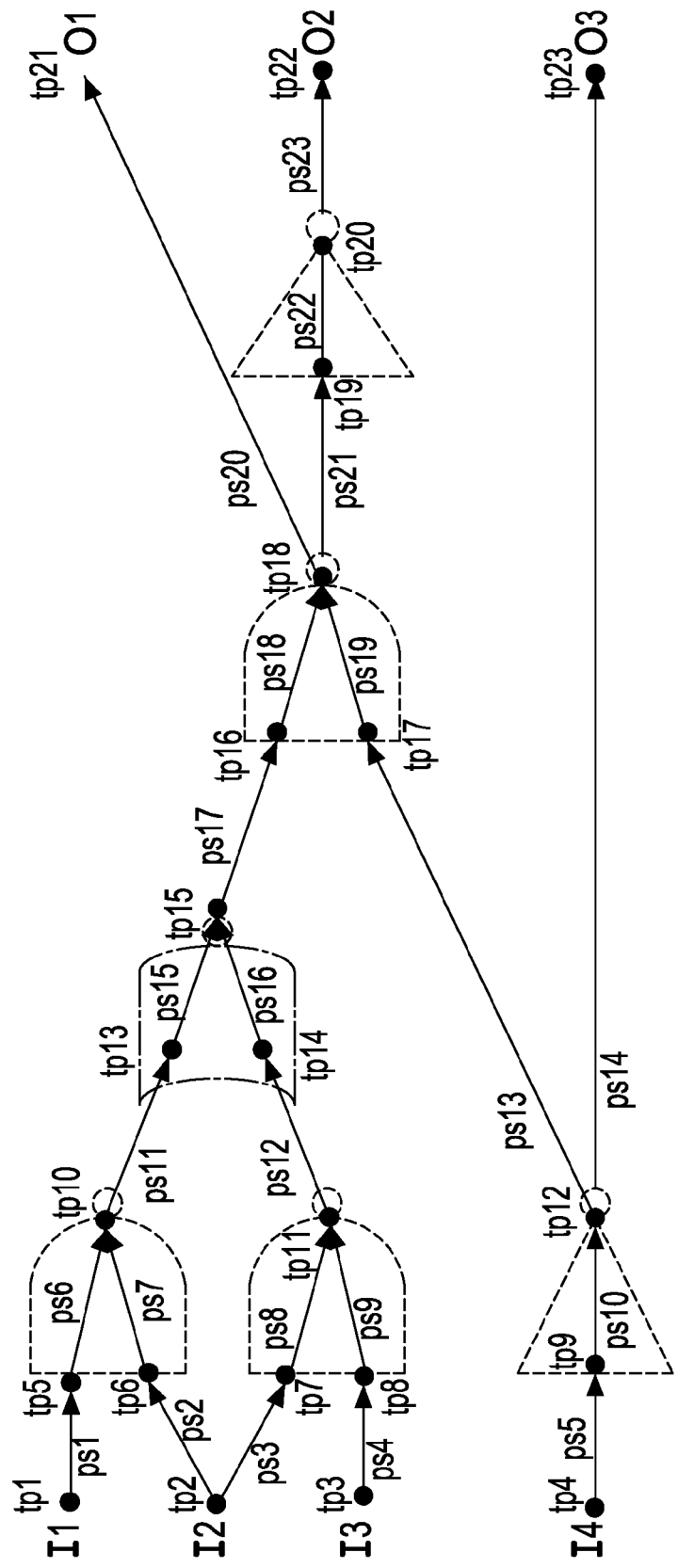
FIG. 2 is an exemplary prior art gate level timing graph.
Figure 4:
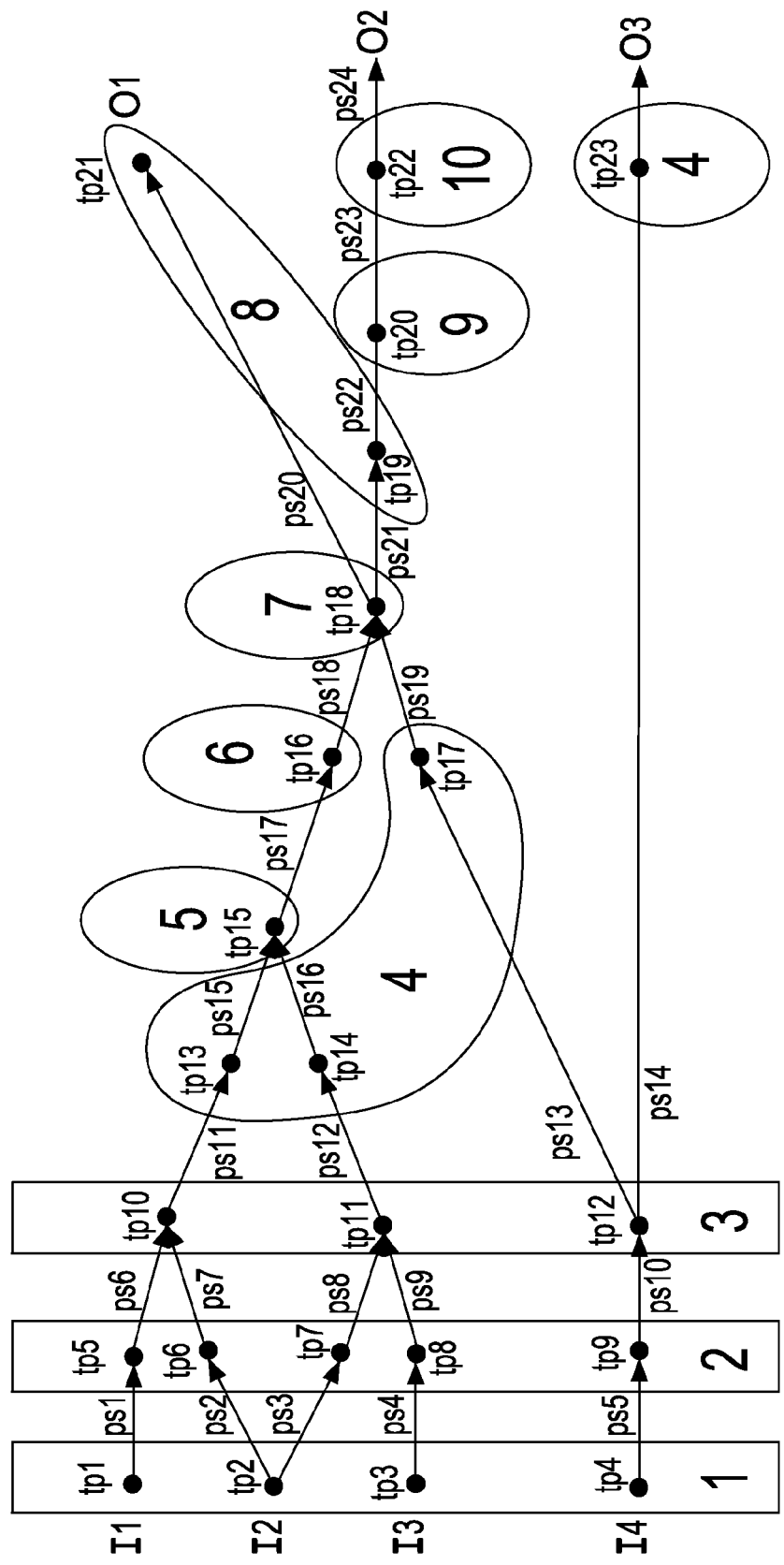
FIG. 4 illustrates a prior art levelized gate level timing graph.

In one embodiment, the present invention provides a method for synthesizing and analyzing electronic circuits. The method makes use of a Static Timing Analysis (STA) to simulate the timing of signals in the circuit to ensure compliance with respect to certain design constraints.

One embodiment of the present invention accelerates the computation through the use of parallel processing, in which computation is distributed between two or more processes executed simultaneously. STA accelerates the computation and independently updates the timing graph without requiring communication through a central coordinator module. The basis of the dynamic scheduling is the concept of predecessor count, rather than AT level representing the number of immediately preceding timing point/propagate segments pairs. The dynamic scheduling associates with each timing point another count of the number of predecessors thus far not processed. In effect, the count is initialized for each timing point to its (static) predecessor count. All timing points with no predecessors (typically at the start of the parallel algorithm, preferably a set of chip primary inputs, but which may also include internal points for which AT is known via user assertions) can be processed immediately. As each timing point, AT is calculated and its successor propagate segment/timing point pairs are examined. For each of these, the successor timing point count of predecessors not processed is decremented by 1. For any successors whose count goes to zero are now "ready to process", i.e., the constraint on their predecessors having been satisfied and the timing point can now be scheduled for processing.

In one embodiment, the manipulation of predecessors not processed counts, and subsequent scheduling of new timing points for processing are performed in parallel, rather than by way of a centralized, sequential process that reduces the degradation of parallel speedup due to Amdahl Law, even in situations where the number of parallel computations grows to or past the number of physical computing elements.

In one embodiment, the present invention employs an incremental STA for circuit optimization, the STA being provided with suitable extensions which can be used to achieve a dynamically scheduled parallel, incremental timing capability.

In one embodiment, a method is provided for conducting parallel analyses on a circuit design, the method including: creating a shared work queue of ready to process independent nodes; assigning the independent nodes from the work queue to at least two parallel computation processes, simultaneously performing node analysis computations thereof; and modifying the circuit design by updating values of the processed independent nodes obtained from the node analysis, the two or more parallel computation processes independently updating the shared work queue to process a new plurality of independent nodes.

DETAILED DESCRIPTION OF EMBODIMENTS

The following detailed description of the current invention is divided into the following embodiments: a first embodiment describes the "bulk" version of the dynamically scheduled parallel Static Timing Analysis (STA), in which ATs and, by analogy, RATs and the like, are computed for a "new" circuit wherein only ATs at the input timing points and RATs at the outputs have been asserted. Another embodiment relates to an "incremental" version of the dynamically scheduled parallel STA, in which it is assumed that a relatively small portion of a previously timed circuit has changed. It further recomputes the timing for the fewest number of timing points and propagates segments dictated by the data dependences implied by the timing DAG. The incremental version is an extension of the bulk version, with mechanisms added to identify ready to process timing points, of which only some of the predecessors need to be recomputed.

For both, the bulk and incremental versions of the program, details will be presented for the AT propagation. Practitioners skilled in the art will recognize that similar programs can be used for propagation of RATs or other quantities, having a backward dependency in a DAG (i.e., a quantity for which value at the source of a propagate segment depend on the value at the sink of the segment) by reversing the roles of predecessors and successors.

Bulk Dynamically Scheduled Parallel STA

Figure 7:
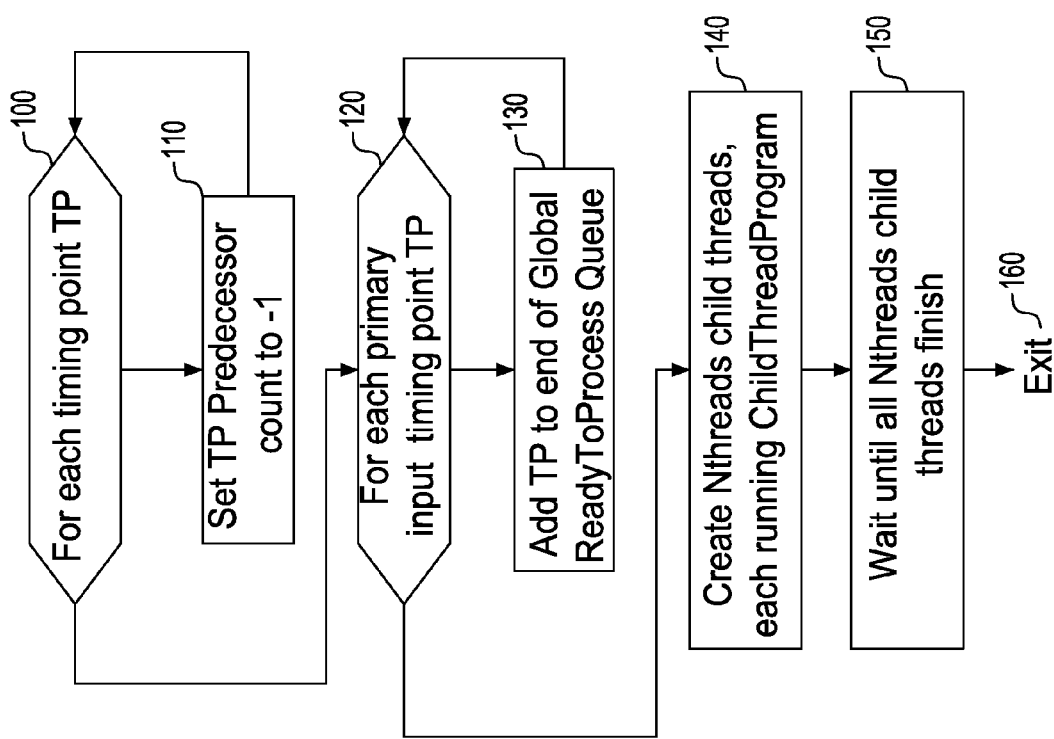
FIG. 7 is depicts main thread program flow chart for a dynamically scheduled parallel bulk STA, according to an embodiment of the invention.

FIG. 7 depicts a top level build dynamically scheduled parallel STA program. The first steps iterate over all the timing points in the timing graph (100) and for each set its predecessors remaining to be processed count (hereinafter, predecessor count) to –1 (110). This value indicates that the predecessor count has not yet been computed (in order to enable computation to count the predecessors from the serial part of the program into the parallel parts).

Still referring to FIG. 7, a second step iterates over the primary input timing points (120). For each, it places a pointer in the Global Ready to Process Queue (130), i.e., a data structure having a varying number of pointers to timing points in the order determined by how they are inserted in the queue. The next step creates a number of independent computing threads, i.e., an input into the program (140); each of the threads executing the Child Thread Program. The top level computation waits until all the child threads have been processed (150), at which time all the propagate segment delays and timing point ATs will have been computed by the child threads, at which point, the application program can now exit (160).

It should be noted that although the present embodiments describe the use of "threads", the same method of achieving a centralized dynamically scheduled parallel static timing analysis can be advantageously implemented through the use of forked processes running on a multiprocessor system, multiple processes running across multiple machines, or any combination thereof.

Figure 8:
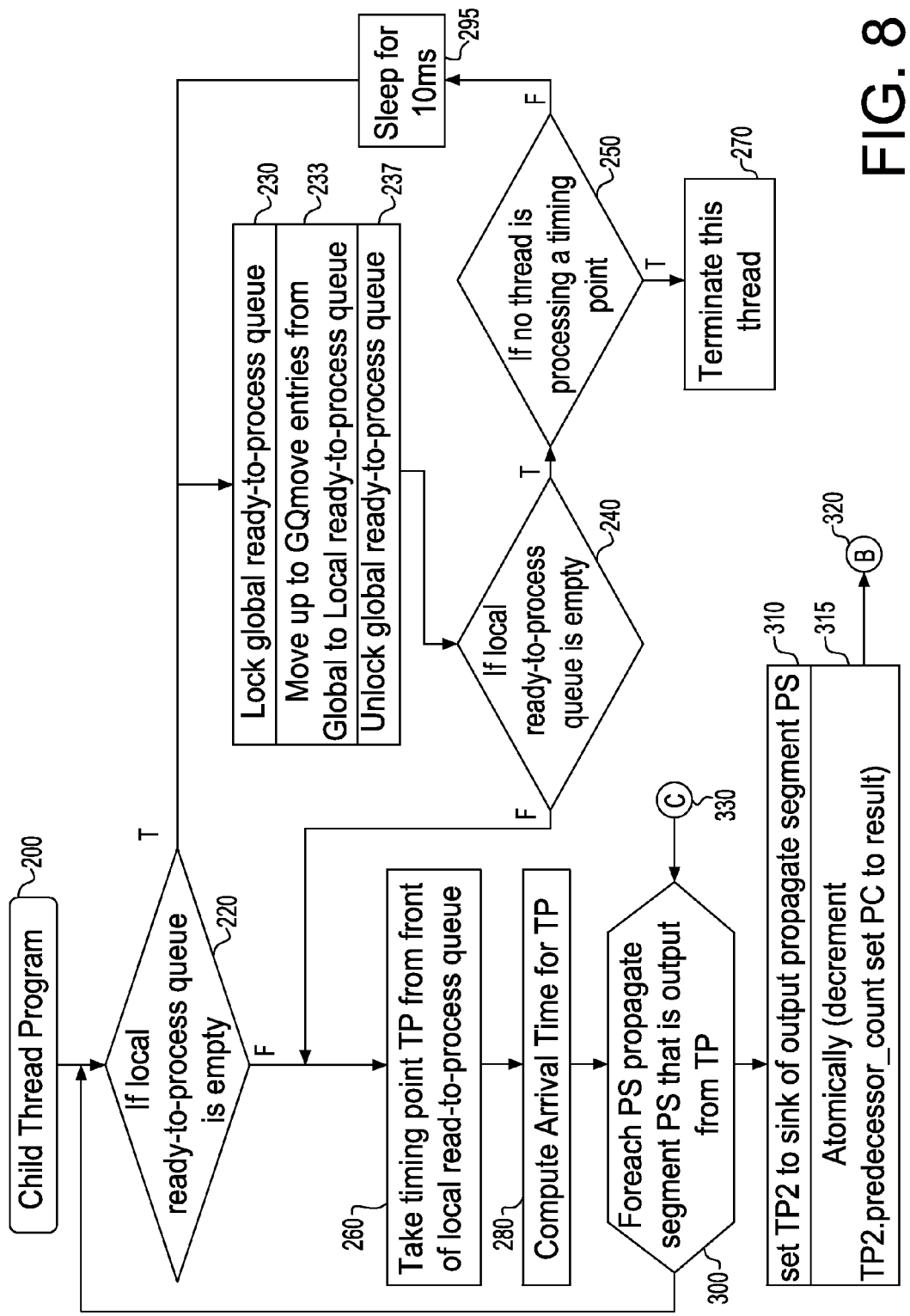
FIGS. 8-9 are flow charts applicable to a Child Thread Program used for the dynamically scheduled parallel bulk STA, according to an embodiment of the invention.
Figure 9:
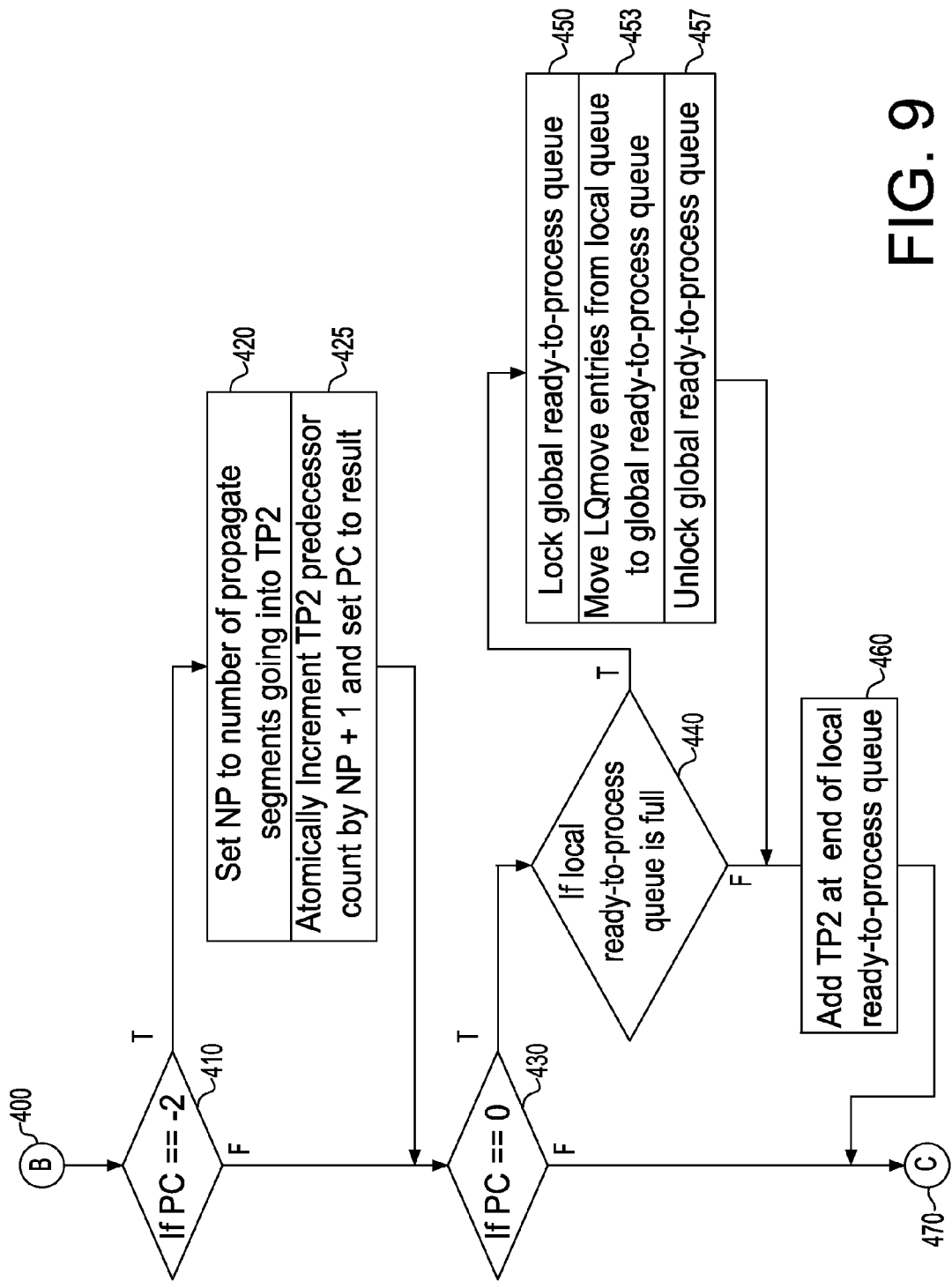

FIGS. 8 and 9 illustrate details of the Child Thread Program which is executed simultaneously by all of the child threads.

Referring to FIG. 8, the Child Thread Program starts by executing when the threads have been created (200). The next step determines whether any pointers to timing points in the local are ready to process queue. This is the data structure similar to the Global Ready to Process Queue described previously, but it differs in that it is intended to be accessed by only a single thread, i.e., each thread maintaining its own per thread Local Ready to Process Queue. Accordingly, accesses to the Local Ready to Process Queue do not require locking, and thus make it possible to avoid time overhead.

Figure 5:
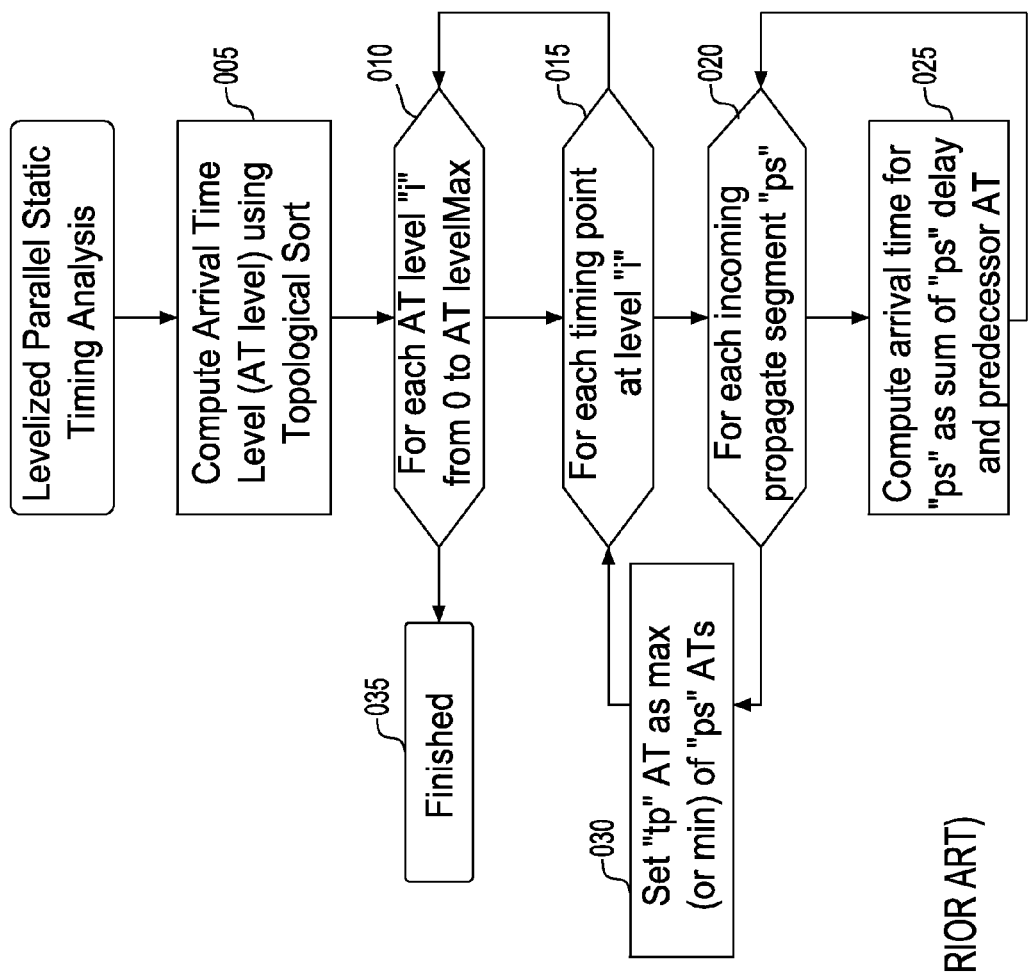
FIG. 5 is an illustrative flowchart for a levelized static timing program, as known in the prior art.
Figure 6:
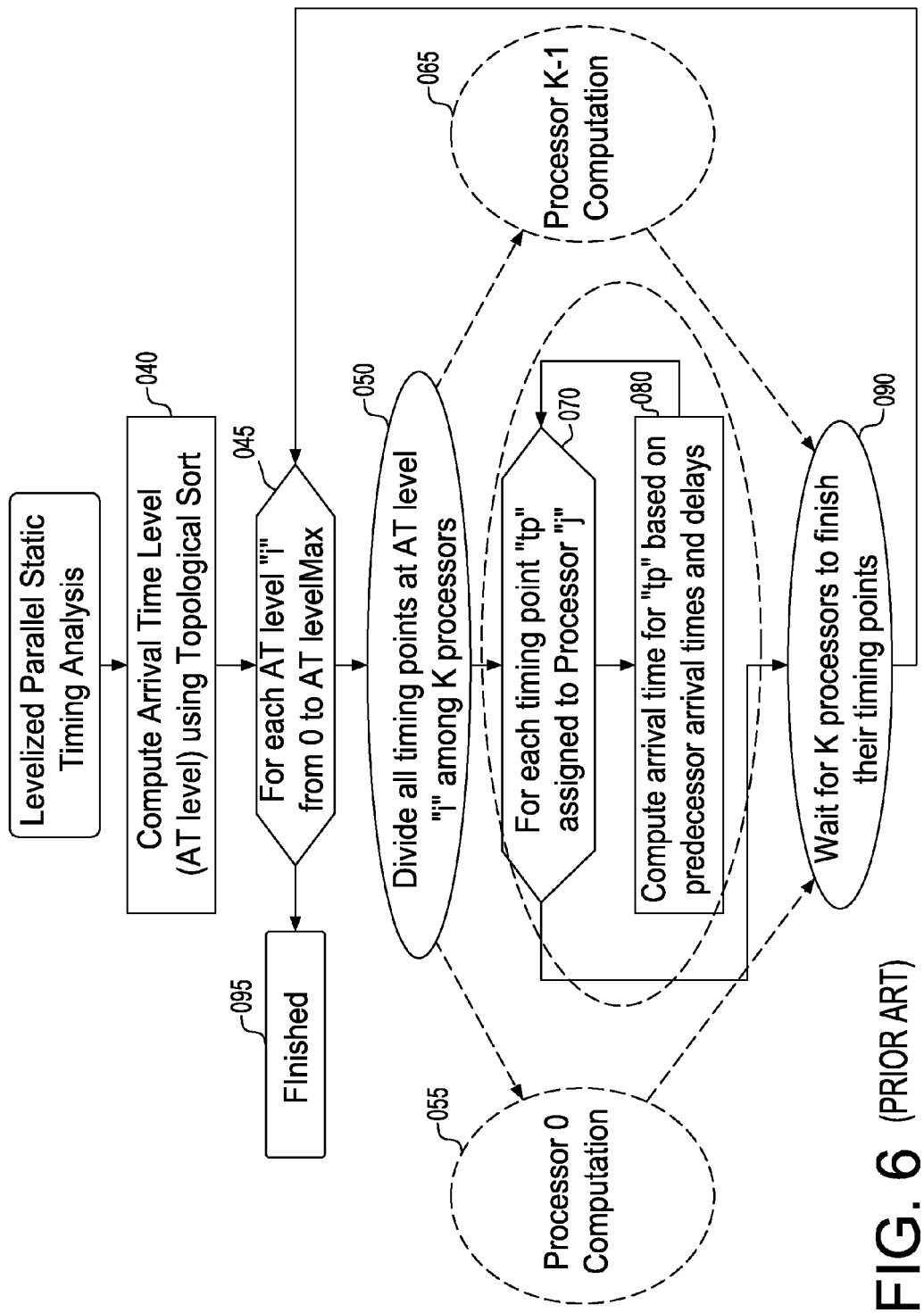
FIG. 6 is an exemplary flowchart of a prior art parallel levelized STA.

If the local queue is empty, the child thread attempts to be ready to process the timing points by locking the Global Ready to Process Queue (230), moving up to GQmove entries from the front of the Global Ready to Process Queue to the Local Ready to Process Queue (233), and releasing the lock on the global queue (237). The lock is necessary to coordinate multiple child threads which, Otherwise, it attempts reading from or writing to the global queue simultaneously. The value of GQmove can be determined empirically to optimize the balance between reducing the locking overhead to access the Global Ready to Process Queue (achieved by increasing GQmove) and preventing load imbalance (achieved by decreasing GQmove). After trying to replenish the local queue from the global queue in steps (230, 233, and 237), the program checks again to see whether any timing point pointers were moved (240). An empty local queue can be attributed to two possible cases: either the entire computation is complete, or there is still some other child thread actively processing a timing point. In such an instance, the current thread can perform additional work by pausing briefly (295), and then regressing back to check the global queue (230). Conversely, if no other child is active, then the current thread terminates (270). When all the Child Threads have been completed, "wait" in the main program (150) terminates, and the overall program ends. If the child determines that there are entries in the local queue, it proceeds to take a timing point TP from the front of the local queue (260). It then computes the AT for TP (280) using the method previously described with reference to FIG. 5 (20, 25, 30). The program then iterates over all the propagate segments that are TP outputs (300). For each propagate segment PS, a sink timing point TP2 is determined (310), and its predecessor count is assigned to the variable PC and decremented (315). The "retrieve and post-decrement" operation sequence must occur without interruption, and is therefore implemented with an atomic fetch and added to or equivalent found on all the computers. Next, the steps between points B (320) and C (330) shown in FIG. 9 are executed.

Referring to FIG. 9, a section of the Child Thread Program is shown starting at point B (400) by comparing PC to the value –2 (410). It acquires this value only if it had the value –1 prior to the "retrieve and post-decrement" step, i.e., the value that all timing points predecessor counts were initialized to, and indicates that the actual predecessor count is preferably computed at this time. The reason for delaying the initialization of TP2 predecessor count is that computation of the predecessor count can require significant computation due to special handling of propagate segments that carry clock signals or any other special constraints. It is therefore advantageous to perform the aforementioned work in parallel, in order to avoid sequential computation overhead, which would limit the overall scalability, according to Amdahl Law. This is done in step (420) and the variable NP is set to this result. Next, the predecessor count of TP2 is atomically incremented by NP+1 and PC is set to the result (425). At this point, PC indicates the number of its predecessor propagate segment/ timing point pairs not yet processed. If PC is equal to zero (430), it is an indication that all the TP2 predecessors have been handled and thus, is it ready to compute AT, wherein a pointer to TP2 is preferably added to one of the ready to process queues. Initially, the local ready to process queue is checked to determine whether it is full (440). If it is, then room is provided by moving some entries to the global ready to the process queue. Since the global queue, unlike the per thread ready to process queues, is shared among all the parallel child threads, access thereto is preferably performed in a critical section by acquiring a global lock (450); moving LQmove entries from the local queue to the global queue (453), followed by releasing the lock (457). At this point, the local ready to process queue is not full and, as a result, TP2 can be added to it (460). The execution stands at point C (470) and proceeds in the flowchart (FIG. 8) starting at point B (labeled 330). At this point, the execution continues by moving to the next propagate segment PS, i.e., one of the outputs of TP, and repeats the previously described logic. When all the propagate segments that are outputs of TP have been processed, execution continues by again looking in the local ready to process queue for the next timing point to process (220). It should be noted that distributing the ready to process queue into two components, a per thread local queue and a single global queue allows many insertions and removals of timing points to be performed on the local queue, thereby avoiding the need for locking (which would otherwise limit a parallel speed-up).

Incremental Dynamically Scheduled Parallel STA

When a modification is made affecting the propagate segment and/or a timing point, then in an incremental timing mode, corresponding ATs and RATs are labeled to be invalid and pointers to corresponding timing points are added to ATQg (as well as RAT queue). The addition of timing point(s) to ATQg does not require to directly initiate any retiming computation. Rather such recomputation may be deferred to the point at which the process makes a query for timing information purposes (e.g., AT) at a particular timing point TP.

Upon a query for new timing information, the actual work necessary to update the timing information is performed by one or more child threads that, in effect, are constantly checked for incremental work. When a request is made, it executes a dynamically scheduled parallel timing computation. It is assumed that the child threads are created initially, e.g., by the top level optimization process after completing the initial bulk timing, wherein such threads need not exit until the overall application is complete.

Figure 10:
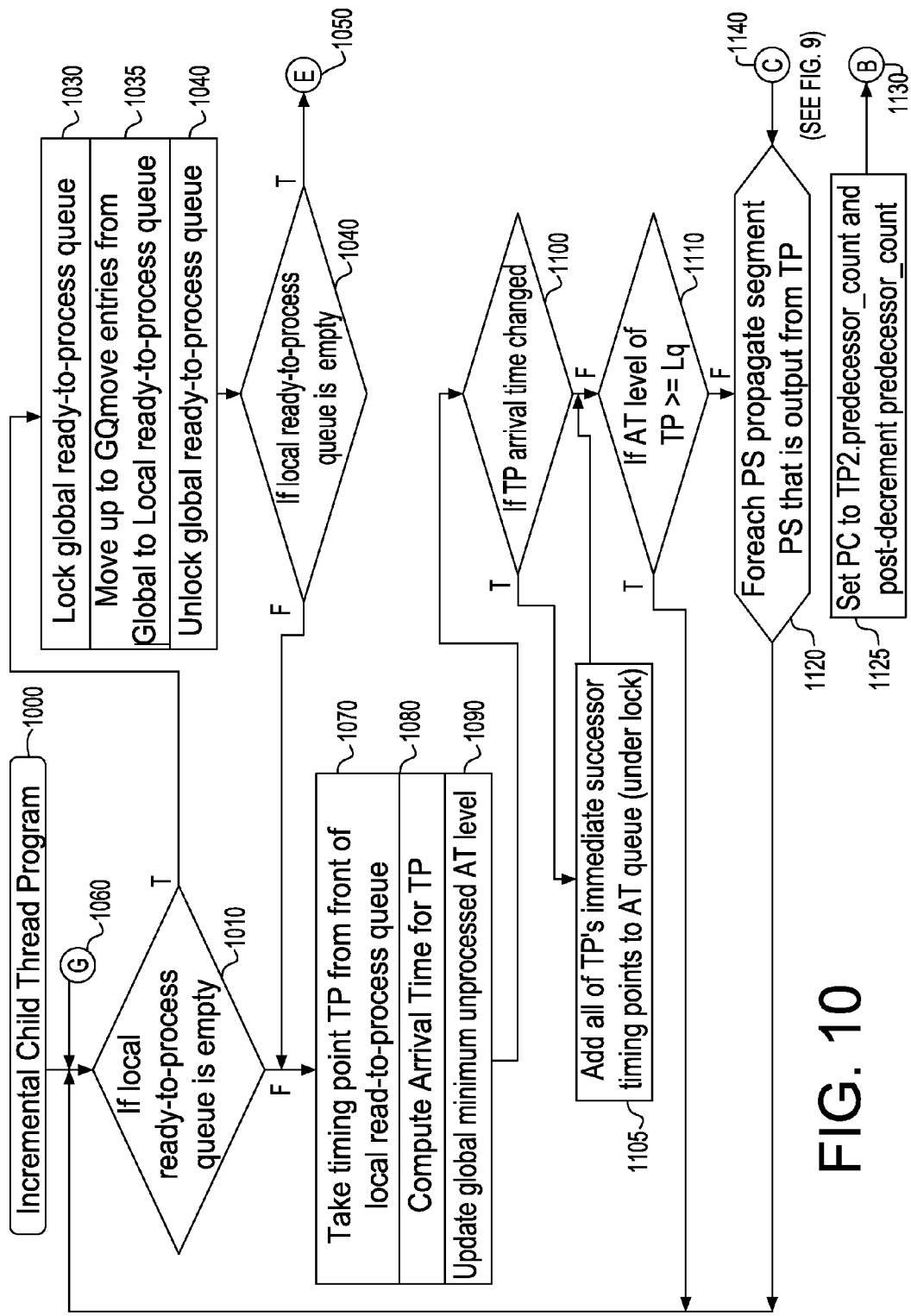
FIGS. 10-11 are flowcharts applicable to an incremental, dynamically schedule parallel static timing program, in accordance with an embodiment of the invention.
Figure 11:
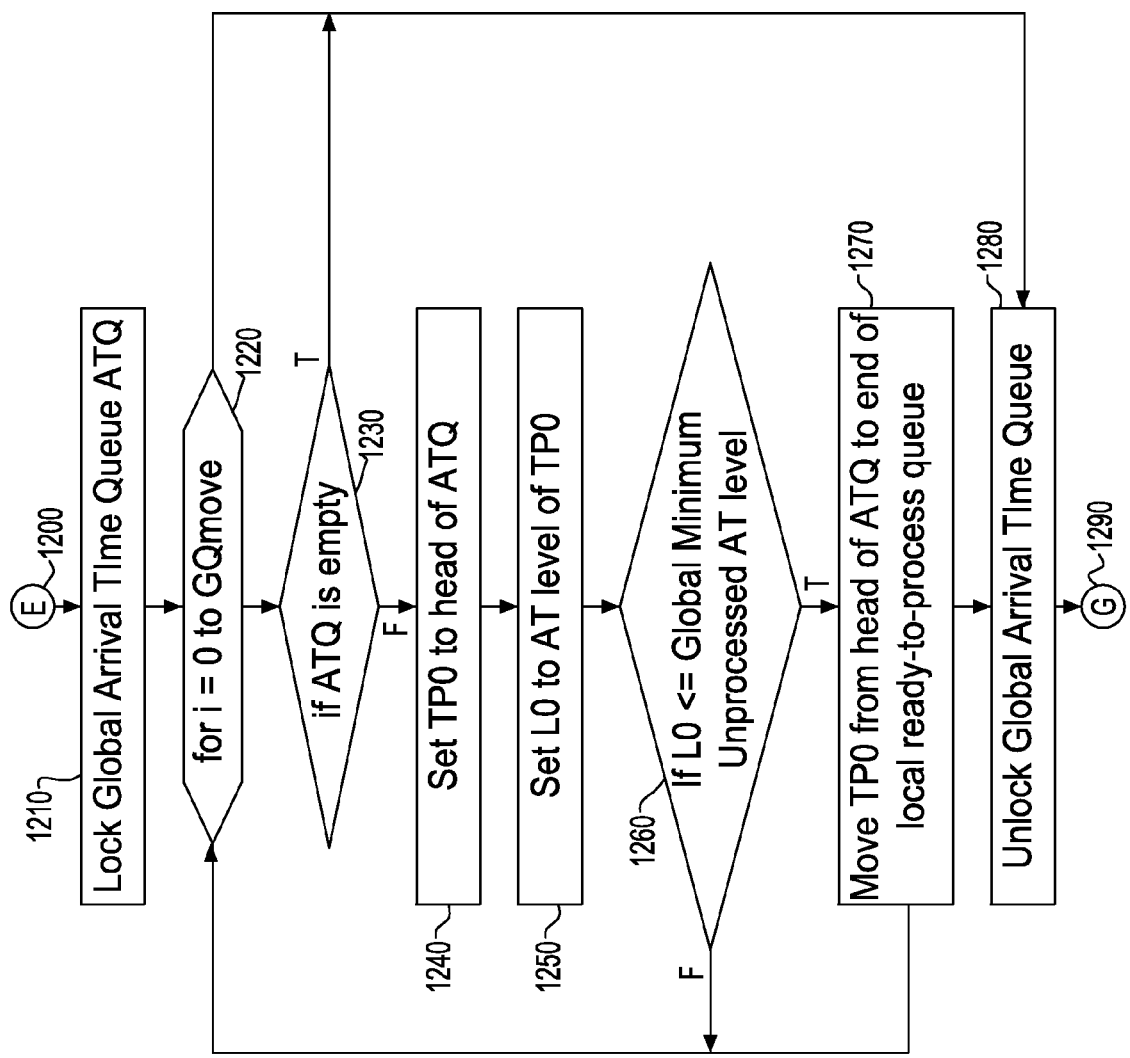

The program that is executed by the child threads—Incremental Child Thread Program—is shown in FIGS. 10-11.

Referring to FIG. 10, the primary difference from the bulk Child Thread Program resides in criteria by which a particular timing point is determined to be "ready to process". In the case of the bulk program, the timing point is ready to process when all its immediate predecessor timing point/propagate segment pairs have completed processing. In the case of the incremental program, if this condition (predecessor count=0) occurs for the timing point, then it is indicative that it is ready to be processed. However, the converse is not necessarily true because for the incremental case, not all the timing point immediate predecessors require to be processed. Furthermore, although one or more of its predecessors does need to be processed, it may not be directly observable, since the actual change that subsequently causes the predecessor to be reprocessed occurs many levels back (or forward, in the case of RAT propagation) in the timing graph (therefore, one cannot determine a priori a target non-zero predecessor count which safely indicates a given timing point is fully ready to calculate). To ensure that reprocessing all the timing points that are affected by the incremental change and that could affect the timing information at the query point TPq, a second condition is introduced by which the timing point can be considered ready to process. This is the case where at least one timing point is on the global AT Queue (ATQg), and its AT level is less than or equal to the Global Minimum Unprocessed AT Level (i.e., the lowest AT Level among all timing points that are currently being analyzed across all instances of Child Thread Program).

The child thread(s) begins its execution at the start of Incremental Child Thread Program (1000), checking whether the local ready to process queue is empty (1010). If so, it attempts to replenish its local ready to process queue from the global ready to process queue in steps (1030, 1035, and 1040). If the ready to process queue has one or more entries (1050), or if it was not yet empty (1010), then the execution continues by preferably taking the first timing point TP from the local ready to process queue (1070) and calculates AT (more generally, the timing value) in step (1080), previously detailed with reference to FIG. 5 (steps 15-30).

At this point, the program diverges from the steps followed by the bulk dynamic parallel program: In step 1090, the global Minimum Unprocessed AT Level variable is updated by inspecting all the current per thread lowest unprocessed AT level values. In step (1100), the new AT calculated for TP is compared with its previous value, and if it has changed, then successors of TP are added to the global AT Queue if not already present (1105). This step must preferably be performed under lock to prevent interference between multiple computations that can attempt to update the AT Queue. In step (1110), the AT level of the latest processed timing point TP is compared to the AT level Lq of the query timing point. If TP AT level is less than Lq, execution proceeds to a section of code (1120, 1125, 1130, and 1140) that performs operations that decrement the predecessor count of all the timing points that are immediate successors of TP. If any count goes to zero, the successor timing point is added to the local ready to process queue, possibly "spilling" the queue to the global ready to the process queue similar to steps (440, 450, 453 and 457) of the bulk dynamic parallel STA program, shown in FIG. 9. In the case where TP AT level is greater than or equal to Lq, then all the TP successor timing points are at an AT level greater than Lq. Thus, they do not need to be processed to satisfy the timing query at Lq. Branching to step (1040), a check is made to determine whether the local ready to process queue is empty. In such an instance, it may be possible to find one on the global AT queue.

Referring to FIG. 11, the flow chart proceeds at connector E (labeled 1200). A lock is acquired for the global AT queue (1210) since the structure can be read from or written to by other child threads. The iteration beginning at (1220) attempts to move up to the GQmove timing points from the global AT queue to the current thread local ready to process queue, as follows: The variable TP0 is set to the timing point at the front of the global AT queue (1240) that ensures that its AT level L0 (1250) is the lowest of any timing point that needs processing. If the AT level L0 is less than or equal to the global Minimum Unprocessed AT level (1260), it is indicative that all the timing points having AT levels less than L0 have been processed, and therefore TP0 is ready to run. Accordingly, it is removed from the front of the global AT queue onto the local ready to process queue (1270) of the thread executing this step. Once the GQmove iterations are complete, the global AT queue is unlocked (1280) and execution continues through connector G back to step (110) in the flow chart illustrated in FIG. 10.

Although embodiments of the invention were described by means of simple illustrative embodiments, it is to be understood that one of ordinary skill in the art can extend and apply this invention in many ways. It is to be understood that while the illustrative example showed a small circuit and a small timing graph, the invention applies to circuits and graphs of any size. In the illustrative example, for purposes of clarity, rising and falling timing quantities were not differentiated, but one of ordinary skill in the art could apply the present invention to a situation with different rising and falling delays, slews, ATs and RATs. Otherwise, it could also apply the invention to any type of static timing, including, but not limited to, static timing of gate level circuits, transistor level circuits, hierarchical circuits, circuits with combinational logic, circuits with sequential logic, timing in the presence of coupling noise, timing in the presence of multiple input switching, timing in the presence of arbitrary timing tests such as setup, hold, end of cycle, pulse width, clock gating and loop-cut tests, and timing in the presence of multiple clock domains. While the present invention has been described for calculation of ATs in static timing analysis, it will be appreciated that data other than timing information may be calculated on nodes of a directed acyclic graph (DAG), including logical values in a logic simulation, noise glitches in a noise analysis. The present invention may be used for parallel calculation of any quantity on nodes of a DAG for which the value(s) for a node depend on the values on the sources of all in-edges of the node, or, using backward propagation, for which the value(s) for a node depend on the values on the sinks of all out-edges of the node.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the scope and spirit of the present invention. It should be understood, however, that the description, while indicating preferred embodiments of the invention and numerous specific details thereof, is given by way of illustration and not of limitation. Many changes and modifications may be made within the scope of the present invention without departing from the spirit thereof, and the invention includes all such modifications.

What is claimed is:

1. A method for conducting a parallel analysis on a circuit design represented by a graph comprising:
    using a computer, creating a global shared queue of ready to process nodes of said graph;
    creating a plurality of local queues of ready to process nodes of said graph, each of which is owned by a separate computation process;
    moving nodes from said global shared queue to said local queues of at least two of said separate computation processes;
    concurrently in said separate computation processes, removing nodes from at least two of said local queues, processing said removed nodes, updating node values in the circuit design, and adding new ready to process nodes to said local queues, wherein said adding said new ready to process nodes is based upon updating predecessor count values; and
    moving at least one node from one of said local queues to said global shared queue when a number of said nodes in said local queue exceeds an upper threshold value.

2. The method recited in claim 1 wherein said moving of said nodes from said global queue to said local queue occurs when a number of nodes in said local queue falls below a lower threshold value.

3. The method as recited in claim 2, wherein said node processing computations consist of at least one of arrival times (AT), slew, and required arrival time (RAT) propagation.

4. The method as recited in claim 1, wherein said analysis comprises static timing analysis (STA).

5. The method as recited in claim 1, wherein said circuit design further comprises hierarchical circuits, circuits with combinational logic, and circuits with sequential logic.

6. The method as recited in claim 4, wherein said STA further comprises timing in presence of coupling noise, timing in the presence of multiple input switching, and timing in the presence of arbitrary timing tests.

7. The method as recited in claim 4, wherein said STA further comprises said timing in the presence of arbitrary timing tests consisting of setup, hold, end-of-cycle, pulse width, clock gating and loop-cut tests, and timing in the presence of multiple clock domains.

8. The method as recited in claim 4, wherein said static timing analysis (STA) consists of at least one of gate level timing analysis, transistor level timing analysis, analysis of multiple clock domains, statistical timing analysis, and deterministic timing analysis.

9. The method as recited in claim 1, wherein said moving nodes from said global shared queue to said local queues concurrently in said separate computation processes removing nodes from at least two of said local queues, processing said removed nodes, updating node values in the circuit design, and adding new ready to process nodes to said local queues, and moving at least one node from one of said local queues to said global shared queue, are repeated until said global shared queue and said plurality of said local queues are empty.

10. The method as recited in claim 1, wherein said multiple computation processes correspond to a plurality of interconnected computers.

11. The method as recited in claim 1, wherein said concurrent removing nodes from at least two of said local queues, processing said removed nodes, updating node values in the circuit design, and adding new ready to process nodes to said local queues in separate computation processes is performed without requiring communication through a central coordinator module.

12. The method as recited in claim 1, wherein said updating predecessor count values is performed as an atomic operation.

13. The method as recited in claim 1 further comprising manipulating said predecessors-not-processed counts and performing a subsequent scheduling of new graph notes for processing in parallel.

14. The method as recited in claim 4 further comprising an incremental static timing analysis (STA) using a dynamically scheduled, parallel, incremental timing.

15. The method as recited in claim 1, wherein said analysis comprises noise glitch analysis.

16. The method as recited in claim 1, wherein said analysis comprises logic simulation.

17. A computer program stored in a non-transitory medium that tangibly embodies program of instructions performing method steps for conducting a parallel analysis on a circuit design represented by a timing graph, the method steps comprising:

using a computer, creating a global shared queue of ready to process nodes of said graph;

creating a plurality of local queues of ready to process nodes of said graph, each of which is owned by a separate computation process;

moving nodes from said global shared queue to said local queues of at least two of said separate computation processes;

concurrently in said separate computation processes, removing nodes from at least two of said local queues, processing said removed nodes, updating node values in the circuit design, and adding new ready to process nodes to said local queues, wherein said adding said new ready to process nodes is based upon updating predecessor count values; and moving at least one node from one of said local queues to said global shared queue when a number of said nodes in said local queue exceeds an upper threshold value.

* * * * *